United States Patent
Hosono et al.

(10) Patent No.: US 7,141,951 B2
(45) Date of Patent: Nov. 28, 2006

(54) DATA STORAGE APPARATUS WITH COMPENSATION FOR VIBRATION AND CONTROL METHOD THEREOF

(75) Inventors: Mirei Hosono, Kanagawa (JP); Isao Yoneda, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/351,707

(22) Filed: Feb. 9, 2006

(65) Prior Publication Data

US 2006/0176004 A1 Aug. 10, 2006

(30) Foreign Application Priority Data

Feb. 10, 2005 (JP) ............................. 2005-034056

(51) Int. Cl.
*G01B 21/02* (2006.01)

(52) U.S. Cl. .................... 318/632; 318/629; 360/75

(58) Field of Classification Search ............... 318/560, 318/611, 621, 629, 632; 360/70, 75
See application file for complete search history.

(56) References Cited

U.S. PATENT DOCUMENTS

| 6,064,540 | A  | * | 5/2000 | Huang et al. ................. 360/75 |
| 6,222,336 | B1 | * | 4/2001 | McKenzie et al. .......... 318/448 |
| 6,496,320 | B1 | * | 12/2002 | Liu .............................. 360/75 |
| 6,567,231 | B1 | * | 5/2003 | Frees .......................... 360/75 |
| 6,614,613 | B1 | * | 9/2003 | Huang et al. ................. 360/75 |
| 6,922,305 | B1 | * | 7/2005 | Price ........................ 360/78.12 |
| 7,035,034 | B1 | * | 4/2006 | Semba et al. ................ 360/75 |
| 2003/0231423 | A1 |  | 12/2003 | Semba et al. |

FOREIGN PATENT DOCUMENTS

JP 2004-152353 5/2004

* cited by examiner

*Primary Examiner*—Bentsu Ro
(74) *Attorney, Agent, or Firm*—Townsend and Townsend and Crew LLP; Patrick Duncan

(57) ABSTRACT

Embodiments of the invention provide a data storage apparatus and its control method capable of accurately reading/writing data. In one embodiment, a data storage apparatus comprises: a servo control section which, based on servo data stored on the storage medium, generates servo control data to control the position of the head; a sensor to detect vibration; a compensation data generating section which generates compensation data to compensate for the head's position error caused by vibration; a drive signal generating section which can generate a drive signal to move the head based on the servo control data; an arithmetic processing section which calculates a rating value to evaluate the level of vibration given to the data storage apparatus wherein the rating value is calculated by using a plurality of sensor output values indicative of the detected level of vibration; and a determination processing section which, according to the updated rating value, determines whether to perform the compensation using the compensation data; wherein the drive signal generating section compensates the servo control data using the compensation data in generating the drive signal.

20 Claims, 4 Drawing Sheets

DATA STORAGE APPARATUS WITH COMPENSATION FOR VIBRATION AND CONTROL METHOD THEREOF

CROSS-REFERENCES TO RELATED APPLICATIONS

This application claims priority from Japanese Patent Application No. JP2005-034056, filed Feb. 10, 2005, the entire disclosure of which is incorporated herein by reference.

BACKGROUND OF THE INVENTION

The present invention relates to a data storage apparatus and its control method. In particular, the invention relates to a data storage apparatus that compensates the motion of the head for vibration detected by a sensor and a control method for such a data storage apparatus.

Data storage devices using various types of media such as optical disks and magnetic tapes are known in the art. Among them, hard disk drives have become popular as storage devices for computers to such an extent that they are one type of the storage devices indispensable for today's computers. Further, not limited to computer systems, the hard disk drives are expanding more and more in application because of its excellent characteristics. For example, hard disk drives are used for moving picture recording/reproducing devices, car navigation systems, and removable memories for use in digital cameras.

Each magnetic disk used in hard disk drives (HDDs) has a plurality of tracks formed concentrically and each track is partitioned into a plurality of sectors. In each sector, servo data and user data are stored. The servo data includes the address of each sector and burst signals. Data can be written to and read from a desired address by the head element unit which accesses the sector according to the address information therein. That is, the HDD allows the head element unit to move to a desired track on the magnetic disk by controlling the current supplied to the voice coil motor (VCM). While following the center of the track according to the burst signals, the head element unit reads or writes data.

The head element unit may be displaced from the track center when the HDD is subject to external vibration. To solve this off-track problem, a variety of methods have been developed. For example, if off-track condition occurs during write, data in another track may be overwritten. One method to solve this problem is to set an acceleration sensor in the HDD to detect vibration and shock. In this method, write is halted if vibration or shock is detected by the acceleration sensor. However, this method deteriorates the performance of the HDD.

Another off-track control method is disclosed in, for example, Patent Document 1 (Japanese Patent Laid-open No. 2003-346439). In the disclosed data storage apparatus, compensating data from acceleration sensors is added to the servo loop. In this method, this head position compensating signal is entered to control the current supplied to the VCM. In addition, injecting the compensating signal into the servo loop is stopped at prescribed timings in this method.

In this method, however, the head happened to move to a wrong position in some cases. For example, if noise is introduced into the output signal of the sensors while there is no vibration, compensation is made based on the noise-introduced signal, perhaps resulting in moving the head to a wrong position. In this case, the HDD deteriorates in performance since data cannot accurately be read/written. Such prior art HDDs having sensors installed therein to detect vibration have this problem in that data cannot accurately be read/written.

BRIEF SUMMARY OF THE INVENTION

The present invention has been made with the above-mentioned situation behind. It is a feature of the present invention to provide a data storage apparatus and its control method capable of accurately reading/writing data.

According to a first aspect of the present invention, there is provided a data storage apparatus that includes a storage medium and a head to write data to the storage medium and/or read data from the storage medium, comprising: a servo control section which, based on servo data stored on the storage medium, generates servo control data to control the position of the head; a drive signal generating section which, based on the servo control data, generates a drive signal to move the head; a sensor to detect vibration; a compensation data generating section which, based on an output of the sensor, generates compensation data to compensate the position of the head for a position error caused by the detected vibration; an arithmetic processing section which calculates a rating value to evaluate the level of vibration given to the data storage apparatus wherein the rating value is calculated by using a plurality of sensor output values indicative of the detected level of vibration; and a determination processing section which, according to the calculated rating value, determines whether to perform the compensation using the compensation data; wherein, if the determination processing section determines to perform the compensation, the drive signal generating section compensates the servo control data using the compensation data in generating the drive signal. This can prevent sudden switching of whether or not to perform the processing of position error compensation, thereby accurately reading/writing data.

According to a second aspect of the present invention, the above-mentioned data storage apparatus is further configured such that at a timing just after the data storage apparatus is powered on, the rating value is calculated and whether to perform the compensation is determined based on the calculated rating value. Thus, the data storage apparatus can be started smoothly.

According to a third aspect of the present invention, the above-mentioned data storage apparatus is further configured such that it further includes a history recording section to record a history of the rating value, and at a timing just after the data storage apparatus is powered on, a rating value is calculated based on the rating value contained in the recorded rating value history. Thus, since the rating value can be allowed to converge quickly, the data storage apparatus can be started smoothly.

According to a fourth aspect of the present invention, the above-mentioned data storage apparatus is further configured such that at a timing just after the data storage apparatus is powered on, whether to perform the compensation is determined before the data storage apparatus becomes ready to read/write data. Thus, the data storage apparatus can be started smoothly.

According to a fifth aspect of the present invention, the above-mentioned data storage apparatus is further configured such that, in an operation mode where the head can be driven, the arithmetic processing section updates the rating value based on the current rating value and the sensor output values; and the number of the sensor output values used to calculate the rating value is larger than the number of the sensor output values used to update the rating value. Thus, when the data storage apparatus is started, the rating value can be allowed to converge quickly, whereby the data storage apparatus can be started quickly.

According to a sixth aspect of the present invention, the above-mentioned data storage apparatus is further configured such that at a timing when the operation mode is switched from a mode where the head is at a standstill to a mode where the head can be driven, the rating value is calculated based on the sensor output values. Thus, even if a long time has passed before the mode where the head can start to move, the level of vibration can be evaluated accurately, thereby reading/writing data accurately.

According to a seventh aspect of the present invention, the above-mentioned data storage apparatus is further configured such that the rating value is calculated based on the sensor output values at a timing when a power-saving mode where data read/write is not performed is switched to a mode where the head can be driven, at a timing when a state where the data storage apparatus is at a standstill is switched to a state where the recording medium starts to rotate, and/or at a timing when returning from a state where the head rests on a ramp or parks on the recording medium. Thus, the mode can be switched smoothly. When a mode is returned from the power save mode, reading/writing data can be performed accurately. Since the influence of the recording medium's rotating performance on the rating value can be reduced, the level of vibration can be evaluated accurately. Even if the recording medium has been at a standstill for a long time, since the rating value is calculated at a timing when the recording medium starts to rotate, the change of the vibration level can be evaluated more accurately. When the head is returned, reading/writing data can be performed accurately. Since the rating value is calculated based on the sensor output value when the head is at a standstill, the influence of the head's movement on the rating value can be reduced.

According to an eighth aspect of the present invention, the above-mentioned data storage apparatus is further configured such that the rating value is based on the integral of the sensor output value. Thus, the vibration level can be evaluated more accurately.

According to a ninth aspect of the present invention, there is provided a data storage apparatus that includes a storage medium and a head to write data to the storage medium and/or read data from the storage medium, comprising: a servo control section which, based on servo data stored on the storage medium, generates servo control data to control the position of the head; a drive signal generating section which, based on the servo control data, generates a drive signal to move the head; a sensor to detect vibration; a compensation data generating section which, based on an output of the sensor, generates compensation data to compensate the position of the head for a position error caused by the detected vibration; a history recording section which records the history of a rating value to evaluate a level of vibration given to the data storage apparatus; an arithmetic processing section which, at a timing just after the data storage apparatus is powered on, calculates a rating value to evaluate the level of vibration given to the data storage apparatus wherein the rating value is calculated based on the sensor output value indicative of the detected level of vibration and a history recorded by the history recording section before the data storage apparatus is powered on; and a determination processing section which, according to the calculated rating value, determines whether to perform the compensation using the compensation data; wherein, if the determination processing section determines to perform the compensation, the drive signal generating section compensates the servo control data using the compensation data in generating the drive signal. Thus, the rating value can be allowed to converge quickly, thereby accurately reading/writing data.

According to a tenth aspect of the present invention, the data storage apparatus is further configured such that it is judged whether the rating value calculated by the arithmetic processing section is appropriate based on the history recorded in the history recording section and, if the rating value is judged not appropriate, a default value is set as the rating value. Thus, the rating value can be allowed to converge quickly, thereby accurately reading/writing data.

According to an eleventh aspect of the present invention, there is provided a control method for a data storage apparatus that includes a storage medium having servo data stored thereon and a head to write data to the storage medium and/or read data from the storage medium wherein servo control data to control the position of the head is generated based on the servo data and the head is moved by a drive signal generated based on the servo control data, said control method comprising the steps of: detecting vibration of the data storage apparatus by a sensor; based on an output of the sensor, generating compensation data to compensate the position of the head for a position error caused by the detected vibration; calculating a rating value to evaluate a level of vibration given to the data storage apparatus wherein the rating value is calculated by using a plurality of sensor output values indicative of the detected level of vibration; and according to the rating value, determining whether to compensate the servo control data by using the compensation data; wherein, if it is determined to perform the compensation, the servo control data is compensated using the compensation data in generating the drive signal. This can prevent sudden switching of whether or not to perform the processing of position error compensation, thereby accurately reading/writing data.

According to a twelfth aspect of the present invention, the above-mentioned control method is further configured such that at a timing just after the data storage apparatus is powered on, a rating value is calculated and whether to perform the compensation is determined based on the calculated rating value. This makes it possible to start the data storage apparatus smoothly.

According to a thirteenth aspect of the present invention, the above-mentioned control method is further configured such that at a timing just after the data storage apparatus is powered on, the rating value is based on the integral of the sensor output value. This makes it possible to more accurately read/write data.

According to a fourteenth aspect of the present invention, the above-mentioned control method is further configured such that in an operation mode where the head can be driven, the rating value is updated based on the current rating value and the sensor output values; and the number of the sensor output values used to calculate the rating value is larger than the number of the sensor output values used to update the rating value.

According to a fifteenth aspect of the present invention, the above-mentioned control method is further configured such that in an operation mode where the head can be driven, the rating value is updated based on the current rating value and the sensor output values; and the number of the sensor output values used to calculate the rating value is larger than the number of the sensor output values used to update the rating value. Thus, when the data storage apparatus is started, the rating value can be allowed to converge quickly, whereby the data storage apparatus can be started quickly.

According to a sixteenth aspect of the present invention, the above-mentioned control method is further configured such that at a timing when the operation mode of the data storage apparatus is switched from a mode where the head is at a standstill to a mode where the head can be driven, the rating value is calculated based on the sensor output values. Thus, even if a long time has passed before the mode where the head can start to move, the change of the vibration level can be evaluated accurately, thereby reading/writing data accurately.

According to a seventeenth aspect of the present invention, the above-mentioned control method is further configured such that the rating value is calculated based on the sensor output values at a timing when a power-saving mode where data read/write is not performed is switched to a mode where the head can be driven, at a timing when a state where the data storage apparatus is at a standstill is switched to a state where the recording medium starts to rotate, and/or at a timing when returning from a state where the head rests on a ramp or parks on the recording medium. Thus, the mode can be switched smoothly. When a mode is returned from the power save mode, reading/writing data can be performed accurately. Since the influence of the recording medium's rotating performance on the rating value can be reduced, the level of vibration can be evaluated accurately. Even if the recording medium has been at a standstill for a long time, since the rating value is calculated at a timing when the recording medium starts to rotate, the change of the vibration level can be evaluated more accurately. When the head is returned, reading/writing data can be performed accurately. Since the rating value is calculated based on the sensor output value when the head is at a standstill, the influence of the head's movement on the rating value can be reduced.

According to an eighteenth aspect of the present invention, the above-mentioned control method is further configured such that the rating value is based on the integral of the sensor output value. This makes it possible to evaluate the level of vibration more accurately.

According to a nineteenth aspect of the present invention, there is provided a control method for a data storage apparatus that includes a storage medium having servo data stored thereon and a head to write data to the storage medium and/or read data from the storage medium wherein servo control data to control the position of the head is generated based on the servo data and the head is moved by a drive signal generated based on the servo control data, said control method comprising the steps of: at a timing just after a power supply is turned on, detecting vibration of the data storage apparatus by a sensor; based on the output of the sensor, generating compensation data to compensate the position of the head for a position error caused by the detected vibration; calculating a rating value to evaluate a level of vibration given to the data storage apparatus wherein the rating value is calculated based on the history of the rating value recorded before the power supply is turned on and a sensor output value indicative of the detected level of vibration; and, according to the rating value, determining whether to compensate the servo control data by using the compensation data; wherein, if it is determined to perform the compensation, the servo control data is compensated by the compensation data in generating the drive signal. Thus, the rating value can be allowed to converge quickly, thereby reading/writing data accurately.

According to a twentieth aspect of the present invention, the above-mentioned control method is further configured such that whether the rating value calculated by the arithmetic processing section is appropriate based on the rating value history and, if the rating value is judged not appropriate, a default value is set as the rating value.

According to the present invention, it is possible to provide a data storage apparatus and its control method capable of accurately reading/writing data.

DETAILED DESCRIPTION OF THE INVENTION

Figure 1:
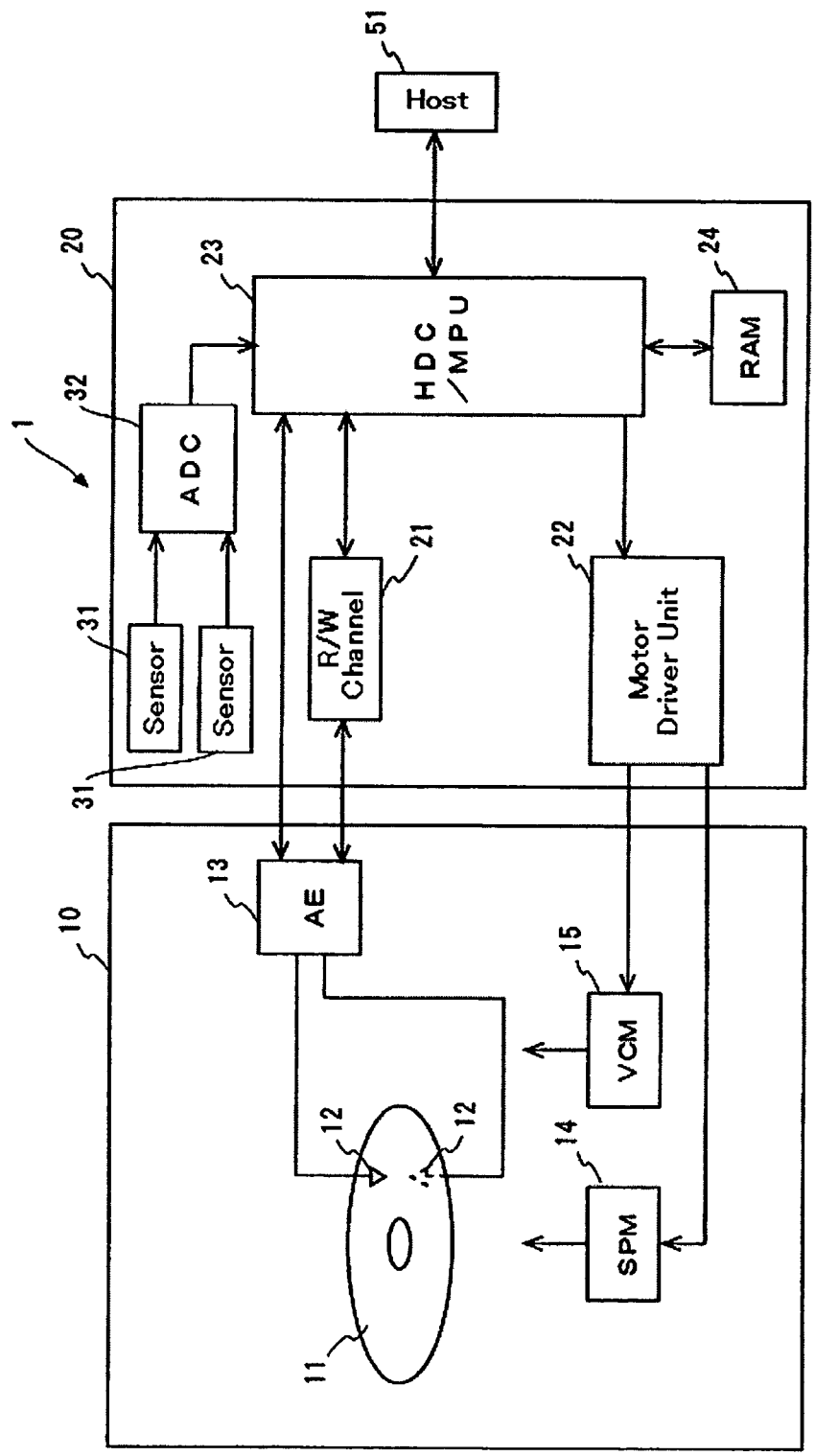
FIG. 1 is a block diagram showing the general configuration of a HDD according to an embodiment.

The following will describe an embodiment of the present invention. Note that to make the description clear, omission and simplification are made as appropriate in the following paragraphs and the accompanying drawings. Those skilled in the art may readily make alterations, additions and changes to each component of the embodiment without departing from the scope of the present invention. Also note that same reference numerals are each used to designate identical elements that are common to the figures and repetitive description is avoided as appropriate in the interest of straightforwardness.

With reference to the drawings, the following will provide a detailed description of a specific embodiment of the present invention. The present embodiment is obtained by applying the present invention to a hard disk drive (HDD), an example of a data storage device. To facilitate understanding of the present invention, its general configuration is described at first. FIG. 1 is a block diagram which schematically shows the configuration of the present embodiment HDD 1. As shown in FIG. 1, the HDD 1 has a magnetic disk 11 which is an example of a recording medium, head element units 12 each of which is an example of a head, arm electronics (AE) 13, a spindle motor (SPM) 14 and a voice coil motor (VCM) 15 in a sealed enclosure 10.

In addition, the HDD 1 has a circuit board 20 fixed to the outside of the enclosure 10. The circuit board 20 is provided with ICs such as a read/write channel (R/W channel) 21, a motor driver unit 22, a hard disk controller (HDC)/MPU integrated circuit (hereinafter HDC/MPU) 23 and a RAM 24 as an example of memory. In addition, the circuit board 20 is provided with sensors 31 for detecting vibration and an ADC 32 for AD-converting the output from the sensor 31. Note that each circuit may be either integrated in a single IC or formed across a plurality of separate ICs.

Write data from an external host 51 is received by the HDC/MPU 23 and written onto the magnetic disk 11 by the head element unit 12 via the R/W channel 21 and the AE 13. In addition, data stored on the magnetic disk 11 is read out by the head element unit 12 and output to the external host 51 from the HDC/MPU 23 via the AE 13 and the R/W channel 21.

Figure 2:
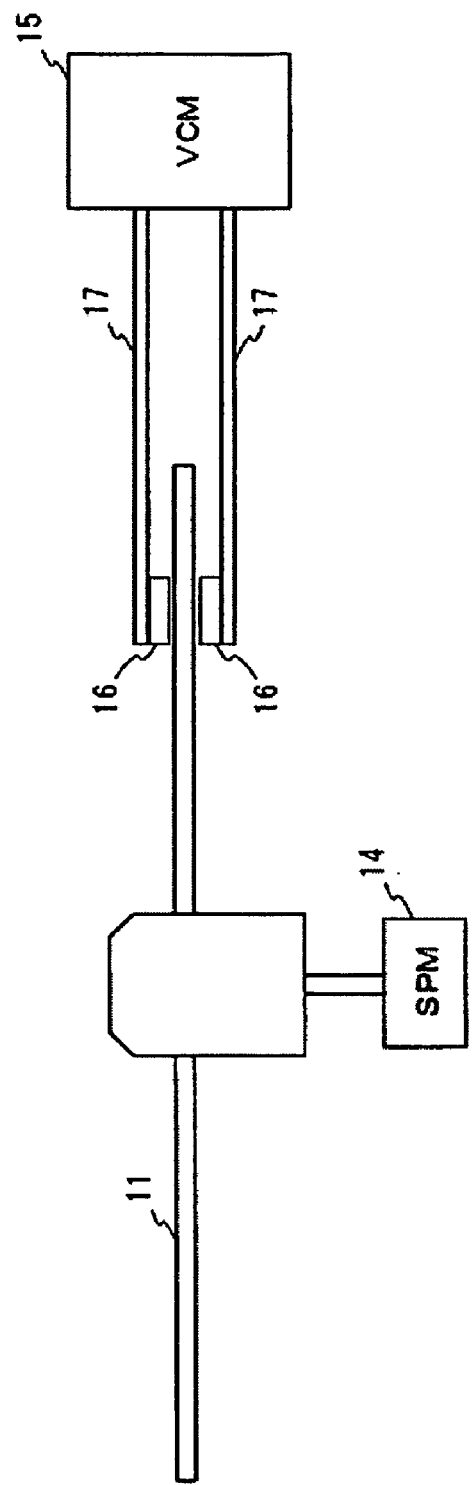
FIG. 2 is a block diagram showing the general configuration of the drive mechanisms of the HDD according to the embodiment.

Now, individual components of the HDD 1 are described. At first, with reference to FIG. 2, the following provides a general description of how the magnetic disk 11 and the head element units 12 are driven. The magnetic disk 11 is fixed to the hub of the SPM 14. The SPM 14 rotates the magnetic disk 11 at a certain speed. According to a drive signal from the HDC/MPU 23, the motor driver unit 22 drives the SPM 14. The magnetic disk 11 in the present embodiment has a data recording surface on each side. Each recording surface is associated with a head element unit 12 (not shown in FIG. 2).

Each head element unit 12 is fixed to a slider 16. Each slider 16 is fixed to a carriage 17. Each carriage 17 is fixed to the VCM 15. Swung by the VCM 15, the carriages 17 move the slider 16 and the head element units 12. The motor driver unit 22 drives the VCM 15 according to a drive signal from the HDC/MPU 23. By this drive signal, the actuator including the VCM 15 is driven to change the position of the head element units 12.

To read/write data from/to the magnetic disk 11, each carriage 17 moves the slider 16 and the head element unit 12 to a data area on the magnetic disk 11. As the result of movement of the carriage 17, the slider 16 and the head element unit 12 moves radially on the surface of the magnetic disk 11. This allows the head element unit 12 to access a desired sector.

Air between the rotating magnetic disk 11 and the ABS (Air Bearing Surface) of the slider 16 facing the magnetic disk causes a pressure due to its viscosity. As a result of this pressure balanced with a force given by the carriage 17 toward the magnetic disk 11, the slider 16 and the head element unit 12 fixed thereto fly above the magnetic disk 11 with a certain gap. Typically, the head element unit 12 has a write head and a read head which are formed integrally. By the write head, an electric signal is converted to magnetic field according to the data to be recorded on the magnetic disk 11. By the read head, magnetic field from the magnetic disk 11 is converted to an electric signal. Note that either one or plural magnetic disks 11 may be contained in the HDD 1. In addition, a recording surface may be formed on either one or both sides of the magnetic disk 11.

Now, returning to FIG. 1, each circuit section is described below. For data access, the AE 13 chooses one head element unit 12 from the plural head element units 12. The signal read out by the selected head element unit 12 is amplified (pre-amplified) in the AE 13 by a certain amount of gain. The pre-amplified read signal is sent to the R/W channel 21. In addition, the write signal from the R/W channel 21 is sent by the AE 13 to a selected head element unit 12.

The R/W channel 21 executes write processing on the data transferred from the host 51. In the write processing, the R/W channel 21 code-modulates the write data supplied from the HDC/MPU 23 and further converts the code-modulated write data to a write signal (current) for supply to the AE 13. In addition, when data is supplied to the host 51, the R/W channel 21 executes read processing. In the read processing, the R/W channel 21 amplifies the read signal supplied from the AE 13 to a certain level of amplitude, extracts data from the obtained read signal and decodes the data. The read data comprises user data and servo data. The decoded read data is supplied to the HDC/MPU 23.

The HDC/MPU 23 is a single chip circuit where an MPU and an HDC are integrated. The MPU operates according to microcodes loaded into the RAM 24. When the HDD 1 is started, not only microcodes which are to run on the MPU but also data required for control and data processing are loaded into the RAM 24 from the magnetic disk 11 or a ROM (not shown in the figure). In addition to positioning control for the head element unit 12, interface control and operations required for data processing such as defect management, the HDC/MPU 23 executes general control of the HDD 1.

Through an interface function provided for the host 51, the HDC/MPU 23 receives user data and commands such as read and write commands sent from the host 51. The received user data is transferred to the R/W channel 21. In addition, the HDC/MPU 23 obtains read data from the magnetic disk via the R/W channel 21 and transmits the read data to the host 51. Further, the HDC/MPU 123 executes ECC processing on the user data obtained from the host 51 or read from the magnetic disk 11. The HDD 1 of this embodiment sends and receives data (including commands, user data and control data) to and from the host 51 through serial or parallel communication.

Data read out by the R/W channel 21 includes servo data as well as user data. The servo data includes address information indicating the address of each sector and burst signals. By using the servo data, the HDC/MPU 23 performs the positioning control of the head element unit 12. That is, when a read or write command is received from the external host 51, the HDC/MPU 23 moves the head element unit 12 to a desired track based on the address information of the servo data. Then, the head element unit 12 follows the center of the track based on the burst signals included in the servo data. Based on the servo data, the HDC/MPU 23 generates a drive signal to drive the motor driver unit 22. The drive signal from the HDC/MPU 23 is output to the motor driver unit 22. A drive current in accordance with the drive signal is supplied by the motor driver unit 22 to the VCM 15. In addition, the HDC/MPU 23 controls data read/write processing by using the servo data.

In addition, the sensors 31 are mounted on the circuit board 20. The sensors 31 are, for example, acceleration sensors to detect the vibration applied to the HDD 1. Specifically, the sensors 31 enable detection of the vibration by sensing the accelerations which the circuit board 20 of the HDD 1 has. Vibration of the HDD 1 may be induced by a variety of sources including the rotation of the incorporated SPM, the seek operation of the actuator, adjacent HDDs in a multiple HDD system filled with plural HDDs like in a disk array system and the environment in which the HDD 1 is set up.

The following describes how rotational vibration is detected in this embodiment. The circuit board 20 has two linear acceleration sensors 31 mounted thereon in order to detect the rotational vibration. For example, the two sensors 31 are disposed at the opposite ends of the circuit board 31. If the HDD 1 vibrates linearly, the two sensors detect acceleration in the same direction. Meanwhile, if the HDD 1 vibrates rotationally, there occurs a difference between the accelerations detected by the two sensors, which makes it possible to detect the rotational vibration of the HDD 1. For example, the angular velocity of the rotational vibration can be calculated based on the difference between the two sensors 31 and the distance between the two sensors. Needless to say, a rotational acceleration sensor may alternatively be used which detects rotational vibration. If the rotational vibration is detected, it is possible to effectively detect the position error of the head element unit.

The outputs of the two sensors 31 are input to the A/D converter (ADC) 32 as a differential signal. This differential signal indicates the difference between the accelerations detected by the two sensors. That is, the differential signal indicates the amplitude and direction of the rotational vibration. The ADC 32 converts the analog differential signal to a digital signal. The digital signal from the ADC 32 is input to the HDC/MPU 23. The value of this digital signal changes depending on the amplitude and direction of the rotational vibration applied to the HDD 1. Note that a filter to remove noise and an amplifier to amplify the analog signal are provided between the ADC 32 and the sensors 31. Alternatively, such a filter and amplifier may be incorporated in the sensors 31.

Based on the digital signal from the ADC 32, the HDC/MPU 23 generates compensation data. Specifically, the compensation data is generated by the HDC/MPU 23 so as to compensate the motion of the head element unit 12 for the vibration detected by the sensors. When the HDD 1 is exposed to a high level of steady-state vibration, the drive signal to be output to the motor driver unit 22 is generated by the HDC/MPU 23 based on the compensation data in addition to the aforementioned servo data. To the VCM 15, the motor drive unit 22 supplies a drive current based on the drive signal. The VCM 15 is driven by this drive current to return the head element unit 12 to a desired position. Therefore, even if vibration occurs, it is possible to accurately read and write data. When the level of vibration given to the HDD 1 is low, however, the drive signal is generated in disregard of the compensation data, that is, the drive signal is generated based only on the servo data.

According to the present invention, position error compensation processing can be executed to correct the position error of the head element unit 12 by using the output of the sensor 31 as mentioned above. In addition, whether to execute the position error compensation processing or not is determined according to the level of steady-state vibration given to the HDD 1. That is, the position error compensation processing is executed when the level of steady-state vibration is high, but not executed when the vibration level is low. When the level of steady-state vibration is low, execution of the position error compensation processing is stopped in order to avoid the influence of noise, etc. When the level of steady-state vibration is low, the head element unit 12 is positioned in disregard of the compensation data even if noise occurs. Practically, this does not have substantial influence since vibration rarely causes off-track condition when the vibration level is low. That is, since the frequency of vibrations causing off-track condition is lower than the frequency of noises, it is possible to more accurately write/read data. Since the position error compensation function is thus turned ON/OFF according to the vibration level, position error correction can be performed effectively. That is, when the environment is free from high-level vibration, it is possible to prevent noise from causing the head element unit 21 to move to a wrong position since position error compensation is not performed. This can raise the performance of the HDD 1.

Figure 3:
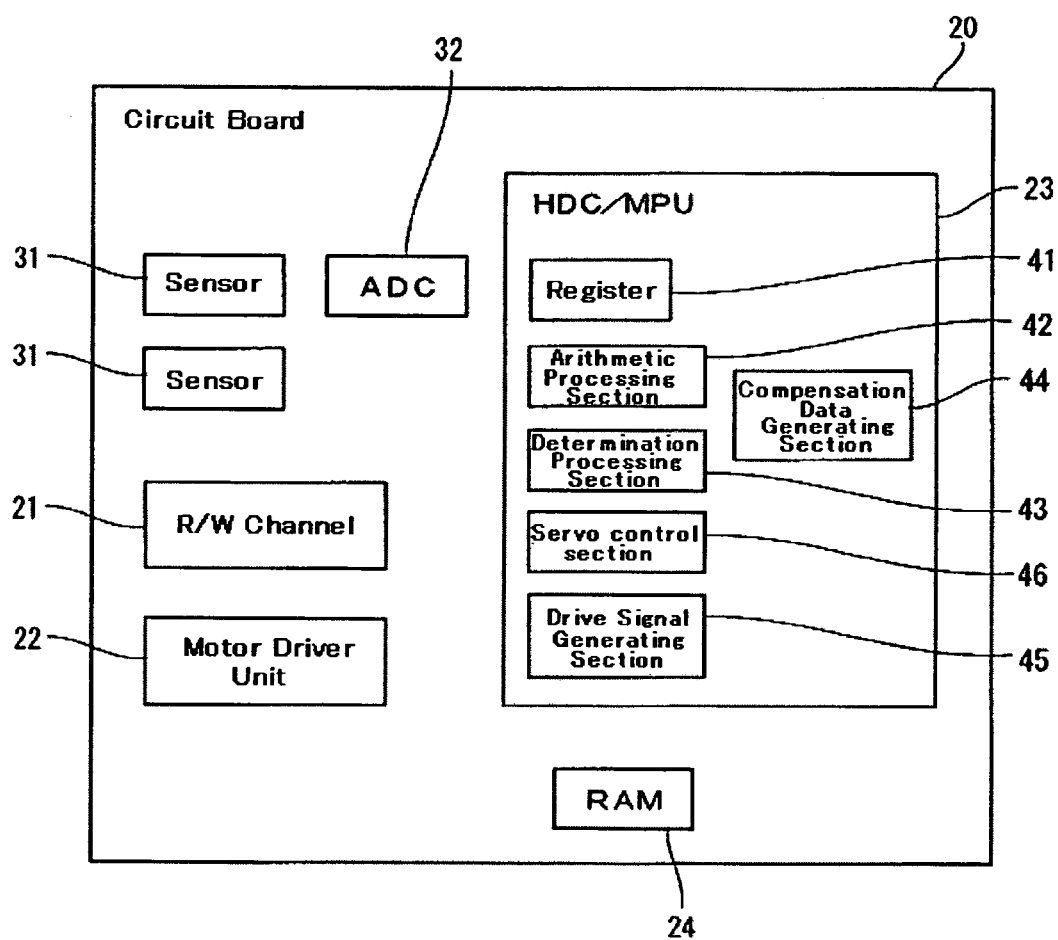
FIG. 3 is a block diagram showing the general configuration of an HDC/MPU mounted on a circuit board in the HDD according to the embodiment.

With reference to FIG. 3, the following describes how this embodiment is configured to determine whether to perform the aforementioned position error compensation processing. FIG. 3 is a block diagram showing the configuration of the circuit board 20. The HDC/MPU 23 includes a register 41, an arithmetic processing section 42, a determination processing section 43, a compensation data generating section 44, a drive signal generating section 45 and a servo control section 46.

The digital signal from the ADC 32 is stored in the register 41. Based on the value stored in the register 41, the arithmetic processing section 42 calculates the vibration amplitude. This value indicative of the vibration amplitude is assumed as the sensor output value. The larger the vibration amplitude is detected by the sensors 31, the larger the sensor output value becomes. The smaller the vibration amplitude is detected, the smaller the sensor output value becomes. Based on the sensor output value, the arithmetic processing section 42 updates the rating value which is a variable to evaluate the level of steady-state vibration given to the HDD 1. The larger the rating value becomes, the higher level of steady-state vibration it indicates. The smaller the rating value becomes, the lower level of steady-state vibration it indicates. The rating value is repeatedly updated at certain timings. Specifically, the arithmetic processing section 42 executes calculation to update the current rating value based on the current rating value and the sensor output value at each update timing. The rating value update timings and calculation methods will be described later.

By comparing the rating value with a threshold, the determination processing section 43 determines whether to perform the aforementioned position error compensation processing. That is, if the rating value is equal to or larger than the threshold, the determination processing section 43 determines to perform the aforementioned position error compensation processing since the level of steady-state vibration given to the HDD 1 is high. On the other hand, if the rating value is smaller than the threshold, the determination processing section 43 determines not to perform the aforementioned position error compensation processing since the level of steady-state vibration given to the HDD 1 is low. If the current rating value is smaller than the threshold and updated to a value larger than the threshold, a state change occurs from a state in which the position error compensation processing is not performed to a state in which the position error compensation processing is performed. If the current rating value is larger than the threshold and updated to a value smaller than the threshold, a state change occurs from a state in which the position error compensation processing is performed to a state in which the position error compensation processing is not performed. The position error compensation function is controlled to turn ON/OFF in this manner.

The compensation data generating section 44 generates compensation data based on the output from the sensors 31. The compensation data is a value based on the amplitude and direction of vibration detected by the sensors 31. The compensation data is used to compensate the motion of the head element unit 12 so as to cancel the position error of the head element unit 12 caused by the vibration. Specifically, the compensation data is a result of processing the digital signal from the ADC 32 by a digital filter. In this case, the digital filter has a prescribed transfer function. The compensation data is output to the drive signal generating section 45. The compensation data is generated at a fixed sampling rate. Then, the compensation data is injected into the servo loop so as to compensate the servo control data described below.

The servo data from the R/W channel 21 is input to the servo control section 46. Based on the servo data, the servo control section 46 generates servo control data. The servo control data is data based on the distance between the current position of the head element unit 12 and a target track. The servo control data is output to the drive signal generating section 45.

Based on the input data, the drive signal generating section 45 generates a drive signal for output to the motor driver unit 22. The drive signal generating section 45 generates the drive signal based on the servo control data. Further, if it is determined by the determination processing section 43 to perform the position error compensation processing, the drive signal generating section 45 generates the drive signal based on the compensation data as well as the servo control data. For example, the drive signal is generated by subtracting the compensation data from the servo control data. The drive signal is output to the motor driver unit 22. Based on the drive signal from the drive signal generating section 45, the motor driver unit 22 supplies a drive current to the VCM 15 for driving it. Thus, based on the drive signal, the actuator including the VCM 15 is activated to move the head element unit 12 on the magnetic disk.

If it is determined by the determination processing section 43 to perform the position error compensation processing, compensation data is injected into the servo loop. If the determination processing section 43 determines not to perform the position error compensation processing, compensation data is not generated or not injected into the servo loop. For example, a switch is provided between the compensation data generating section and the drive signal generating section. This switch is turned on/off by a signal from the determination processing section 43 to control the injection of compensation data into the servo loop.

The following describes the arithmetic processing which is executed by the above-mentioned arithmetic processing section 42 to update the rating value. In this embodiment, the rating value is updated at certain timings which are described later. At first, the following describes a first arithmetic processing method executed for updating the evaluation. In the first arithmetic processing, the current rating value is compared with the sensor output value. Then, if the rating value is larger than the sensor output value, a constant is added to the rating value. Likewise, if the rating value is smaller than the sensor output value, a constant is subtracted from the rating value. This processing is described below in detail. Note that rvadc, integ_rvadc and conv denote the sensor output value, rating value and constant, respectively, in the following description.

At first, the current rating value integ_rvadc is compared with the sensor output value rvadc. Then, if the current rating value integ_rvadc is smaller than the sensor output value rvadc, the constant conv is added to the current rating value integ_rvadc. That is, the updated rating value integ_rvadc will be the sum of the current rating value integ_rvadc and the constant conv. This arithmetic processing is expressed as below:

If $integ\_rvadc_n < rvadc$
$integ\_rvadc_{n+1} = integ\_rvadc_n + conv$ where $integer\_rvadc_{n+1}$ is the updated rating value and $integ\_rvadc_n$ is the current rating value.

On the other hand, if the current rating value integ_rvadc is larger than the sensor output value rvadc, the constant conv is subtracted from the current rating value integ_rvadc. That is, the updated rating value integ_rvadc will be the current rating value integ_rvadc minus the constant conv. This arithmetic processing is expressed as below:

If $integ\_rvadc_n > rvadc$
$integ\_rvadc_{n+1} = integ\_rvadc_n - conv$

In addition, if the current rating value integ_rvadc is equal to the sensor output value rvadc, the current rating value integ_rvadc does not change. That is, the updated rating value integ_rvadc will be equal to the current rating value integ_rvadc. This arithmetic processing is expressed as below:

If $integ\_rvadc_{n+1} = rvadc$
$integ\_rvadc_{n+1} = integ\_rvadc_n$

Then, based on the thus updated rating value, the above-mentioned determination processing section 43 determines whether to execute the position error compensation processing. Since the rating value is updated by adding or subtracting a constant to or from the current rating value as described above, it is possible to prevent the position error compensation function from turning on/off abruptly due to transient vibration and noise. The position error compensation processing can therefore be executed stably.

In the first arithmetic processing, the current rating value is compared with the sensor output value and, depending on the comparison result, a constant is added or subtracted. This makes the rating value closer to the sensor output value. As this update is repeatedly executed, the rating value converges to a certain value with some time constant. In other words, the rating value is integrated by executing the update repeatedly. The integral time is dependent on the sampling rate of the ADC 32 and the number of samples. The converged rating value conforms to the level of steady-state vibration given to the HDD 1. That is, if the HDD 1 is subject to a high level of steady-state vibration, the rating value converges to a large value since the probability of the sensor output value being large is high. On the other hand, if the level of steady-state vibration given to the HDD 1 is low, the rating value converges to a small value since the probability of the sensor output value being large is low. Therefore, when the level of vibration given to the HDD 1 is high, the position error compensation processing is executed. On the other hand, when the level of vibration given to the HDD 1 is low, the position error compensation processing is not executed. Therefore, when the level of vibration given to the HDD 1 is low, it is possible to prevent the head element unit 12 from moving to a wrong position due to noise and the like from the position error compensation sensors 31 or the ADC 32. This can raise the performance of the HDD 1. Since the rating value is updated based on the current rating value and the sensor output value as described above, it is possible to calculate a rating value suitable for use in determining whether to execute the position error compensation processing.

Vibration given to the HDD 1 is usually changing with time. Since whether to perform the position error compensation processing is determined based on the level of steady-state vibration, it is possible to appropriately determine whether to execute the position error compensation processing. That is, since the rating value converges to a certain value with time, it is possible to appropriately evaluate the level of vibration attributable to the environment in which the HDD 1 is set up. This makes it possible to appropriately determine whether to execute the position error compensation processing.

Note that although the above-mentioned constant conv is a positive constant, the value of conv may be made variable as well. For example, the rating value can be converged faster by setting a larger value to conv. In this case, after the rating value is somewhat converged in a certain period of time, the value of conv is set to a smaller value. By changing the value of conv in accordance with a desired speed of convergence, it is possible to more accurately perform determination. Further, it is also possible to give a factor to the current rating value and perform weighting on the relationship between the current rating value and the updated rating value.

The following describes a second arithmetic processing method. In the second arithmetic processing, plural sensor output values during a certain period are added up and the rating value is updated based on the sum. That is, the rating value is determined based on the integral of the sensor output during a certain period. Specifically, the current rating value and a certain number of sensor output values (the number of samples) are added up at a prescribed timing. The updated rating value will be a value obtained by dividing the total sum by the number of samples. This arithmetic processing is expressed as below:
WHILE (sample_cnt)
   integ_rvadc=integ_rvadc+rvadc
END
integ_rvadc=integ_rvadc/sample_cnt where sample_cnt denotes the number of samples.

Then, based on the thus updated rating value, the determination processing section 43 determines whether to execute the position error compensation processing.

As described above, the rating value is updated based on the current rating value and the sensor output value at the update timing. The rating value is updated to a value obtained by adding up the current rating value and sample_cnt sensor output values and dividing the total by sample_cnt. Executing this update converges the rating value to a certain value. This converged rating value conforms to the level of steady-state vibration given to the HDD 1. Similar to the first-mentioned processing method, position error compensation can therefore be done accurately. In addition, since the rating value converges faster than in the first-mentioned method, both quick and accurate determination can be done.

Rating value updated as described above may be recorded as a history. Thus, when the power supply is turned on, the history is read in. This makes it possible to accurately evaluate the vibration level immediately after the power supply is turned on. For example, the latest rating value is recorded as a history. Needless to say, the history may contain either only the latest single rating value or the latest plural rating values. The past or current rating values are thus recorded as a history. If the power supply is turned on later, the rating value recorded as a history may be set as the initial rating value before the rating value begins to be updated. The history may be recorded either in the RAM 24, on the magnetic disk 11 or in an EEPROM (not shown in the figure) mounted on the circuit board 20. That is, the RAM 24, the magnetic disk 11 or the EEPROM forms a history recording section where the history is recorded. In the history, the largest and lowest rating values ever may also be recorded. When the HDD 1 is started, it is possible to reduce the time for the rating value to converge if the rating value begins to be updated with an initial value based on the history.

The following provides a description of when the above-mentioned arithmetic processing is performed to update the rating value. In the present invention, the arithmetic processing section 42 executes arithmetic processing at the following four timings to calculate the rating value.
(1) Seek start timing at which the head element unit 12 begins to be moved according to a read/write command sent from the host.
(2) Error recovery execution timing.
(3) Power on reset timing.
(4) Operation mode transition timing.

Processing at timing (1) is described below. A read command or a write command (hereinafter, R/W command) is sent to the HDD 1 from the host. The rating value is updated when a seek is performed by the actuator based on this R/W command. Based on the updated rating value, it is determined whether to perform the position error compensation processing. Then, a migration distance is calculated by the MPU/HDC 23 of the HDD 1 based on the address of a sector in which write or read operation is to be performed and the servo data being read out by the head element unit 12. If the position error compensation processing is enabled, the position error attributable to the vibration detected by the sensor is included in the calculated migration distance. Based on this migration distance, the MPU/HDC 23 generates a drive signal for output to the motor driver unit 22. The motor driver unit 22 drives the VCM 15 to move the head element unit 12.

Usually, the head element unit 12 is motionlessly staying on a track until a seek is started. That is, a seek starts with the head element unit 12 which is initially staying on a track. At timing (1), the rating value is updated based on the sensor output value when the head element unit 12 is not moving. This can reduce the effect of the actuator's action on the rating value. That is, it is possible to prevent the updated rating value from being influenced by the vibration which would be induced by the actuator if the actuator is driven. In other words, the rating value can be updated based only on the vibration given to the HDD 1 from the surrounding environment. This allows the accurate, exclusive evaluation of the level of steady-state vibration given to the HDD 1 from the surrounding environment. Since the level of steady-state vibration occurring in the environment where the HDD 1 is set up can accurately be evaluated, it is possible to more accurately determine whether to perform the position error compensation. At timing (1), the rating value is updated by, for example, the first-mentioned arithmetic processing.

In this embodiment, the rating value is updated based on R/W commands. In performance mode where R/W operation is performed, since it is typical that seeks are done continually, this timing is appropriate for updating the rating value. It is possible to accurately evaluate the level of steady-state vibration. Further, since neither a timing circuit nor a timer must be added to update the rating value, it is possible to simplify the configuration. In particular, if the timing frequency based on the servo loop is too high to be used for updating the rating value, it is preferable to update the rating value based on R/W commands. That is, since the period of the servo loop may be shorter than the time required by the first-mentioned arithmetic processing, the first-mentioned arithmetic processing may not be carried out. In this case, it is not necessary to newly add a timer or the like if the rating value is updated based on R/W commands. This allows a simple configuration to update the rating and determine whether to turn ON/OFF the position error compensation function based on the updated rating value.

Timing (2) is described below. At (2), the rating value is updated in an error recovery step. If executing data read/write at some address results in an error due to vibration or some other factor, the error recovery step retries the data read/write at the same address. At timing (2), the rating value is updated when error recovery is started after an error occurred once or plural times repeatedly. Similarly to timing (1), it is possible to accurately determine whether to perform the position error compensation since the head element unit is not moving at the timing when the error recovery is started.

Further, if a large transient vibration is applied, the probability of read/write error occurrence rises. This means that the position error compensation function can effectively be turned ON if the rating value is updated at timing (2). When the position error compensation function is OFF, the probability of error occurrence is high if a large vibration occurs. Updating the rating value at the error recovery timing makes it possible to immediately turn ON the position error compensation function. That is, this function can be turned ON at effective timing so as to prevent the error from occurring repeatedly. At timing (2), the rating value is updated by, for example, the first-mentioned arithmetic processing.

Processing at timing (3) is described below. At the power on reset (POR) timing, the rating value is updated by the second-mentioned arithmetic processing before the HDD 1 becomes ready to perform R/W. Then, based on the updated rating value, it is determined whether the position error compensation is to be executed. Specifically, the value in the history is checked first at the POR timing. With this value set as the initial rating value, the second-mentioned arithmetic processing is performed.

There may be a difference between the level of steady-state vibration before the power supply is turned OFF and that after the power supply is turned ON again later. That is, if a long period of time passes after the power supply is turned OFF, the level of steady-state vibration may show a change in accordance with that of the ambient environment when the power supply is turned on again. Even in this case, it is possible to accurately evaluate the level of steady-state variation since the rating value is updated upon power on before the HDD 1 becomes ready to perform R/W. Therefore, the HDD 1 can be started smoothly even if the vibration level changes after the power supply was turned OFF.

Processing at the POR timing is described below in detail. If the power supply is turned on, the HDC/MPU 23 checks the recorded history. Then, the second-mentioned arithmetic processing is executed by using a value recorded in the history as the initial rating value. That is, the sensor output value is integrated over a prescribed number of samples to update the initialized rating value. Since the rating value is thus updated at the POR timing based on the integral of the sensor output value, the level of steady-state vibration can be evaluated quickly and accurately. Even if no rating values are recorded as a history, the HDD 1 can be started smoothly by calculating the rating value based on the integral of the sensor output value. In this case, a rating value is set based on the integral of the sensor output value and this rating value is updated.

Then, it is judged whether the calculated rating value is adequate. For example, the largest and smallest rating values ever are recorded as a history. If the updated rating value does not fall between the largest value and the smallest value, the updated rating value is judged as not adequate. In this case, a predetermined default value is set as the rating value since it is judged that the updated rating value does not adequately evaluate the vibration level after the POR. Since the rating value is thus updated at the POR timing, the HDD 1 can be started smoothly.

At timing (3), the second-mentioned arithmetic processing is performed. Therefore, the rating value can be converged faster than at timings (1) and (2). In the second-mentioned arithmetic processing, the sensor output value is integrated over a certain number of samples. In other words, the rating value is updated using a plurality of sensor output values. On the other hand, the first-mentioned arithmetic processing updates the rating value based on a single sensor output value. The second-mentioned arithmetic processing updates the rating value based on more sensor output values than the first-mentioned arithmetic processing. Therefore, since the second-mentioned arithmetic processing is easier to reflect the sensor output value and converge the rating value than the first-mentioned arithmetic processing, the changing level of steady-state vibration can be evaluated both quickly and accurately.

By performing the second-mentioned arithmetic processing at the POR timing in this manner, the rating value can be converged immediately after the power supply is turned on. In the subsequent normal R/W operation, the rating value is updated from the converged value. That is, if the power supply is turned on, the rating value is once converged and then repeatedly updated in the subsequent normal R/W operations. Therefore, the vibration level can accurately be evaluated.

Timing (4) is described below. At timing (4), the rating value is updated after the operation mode is switched. Similar to timing (3), the vibration level may also show a change in this case. By updating the rating value at this timing, the changing level of vibration can accurately be evaluated upon switching of the operation mode. Also at this timing, the second-mentioned arithmetic processing is performed to update the rating value.

In the HDD 1, to reduce power consumption, a plurality of power saving modes, such as no-operation active mode, idle mode in which only track following is done with no read/write and sleep mode in which the disk rotating spindle motor is stopped, are usually available in addition to performance mode in which ordinary R/W and seek are executed. When the operation mode switches to another operation mode, the rating value is updated to determine whether to perform the position error compensation. Even if the rating value is not updated for a long time in the same operation mode, it is possible to quickly and accurately evaluate the level of steady-state vibration when the operation mode is switched. Similar to (3), it is therefore possible to accurately evaluate the changing level of steady-state vibration.

Specifically, the rating value is updated at the timings when the operation mode is switched from the active mode, the idle mode and the sleep mode, respectively. Further, if a ramp load system is employed, the rating value may be updated when the head element unit 12 is returned from the ramp. In addition, if the CSS (Contact Start Stop) system is employed, the rating value is updated when the head element unit 12 is returned from the parking position. At these timings, since the head element unit 12 is at a standstill, it is possible to accurately evaluate the level of steady-state vibration attributable to the environment. Furthermore, since the rating value is updated at these timings, the vibration level can accurately be evaluated when the operation mode returns to the performance mode to execute R/W. Thus, the position error compensation function can effectively be turned ON/OFF.

It is also possible to update the rating value either in the active mode, idle mode or sleep mode. As well, the rating value may be updated when the head element unit 12 is either at the parking position or the ramp position. Also at these timings, it is possible to accurately evaluate the level of steady-state vibration attributable to the environment since the head element unit 12 is at a standstill. Furthermore, in the sleep mode, the level of steady-state vibration attributable to the environment can be evaluated more accurately without being influenced by the action of the SPM 14 since the SPM 14 is stopped. By calculating the rating value when the head is at a standstill in this manner, it is made possible to accurately evaluate the vibration level when the head becomes ready to move.

Preferably, determination processing at timing either (3) or (4) is completed before the head becomes ready to be driven. This ensures that appropriate determination is made on whether to perform the compensation before R/W is actually done. It is therefore possible to accurately read/write data. Accordingly, the number of samples is set so that the determination processing can complete before the head becomes ready to be driven. Completing the determination processing before the head becomes ready to be driven is also effective in reducing the influence of the actuator on the rating value.

In the present invention, the rating value is updated at timings (1) through (4) as mentioned above. Therefore, since another circuit, such as a timing circuit or a timer, need not be included, it is possible to simplify the control circuit. Also note that the aforementioned arithmetic processing may be implemented by either software or some hardware structure.

Needless to say, updating the rating value is not limited to the above-mentioned timings. For example, the rating value may be updated at regular intervals. In this case, the HDC/MPU 23 has a timing circuit, a timer or the like included therein. It is also possible to allow the user to set the rating value update interval. Alternatively, this interval may be set or changed by a command from the host. The rating value may be updated at preset timings in this manner.

Figure 4:
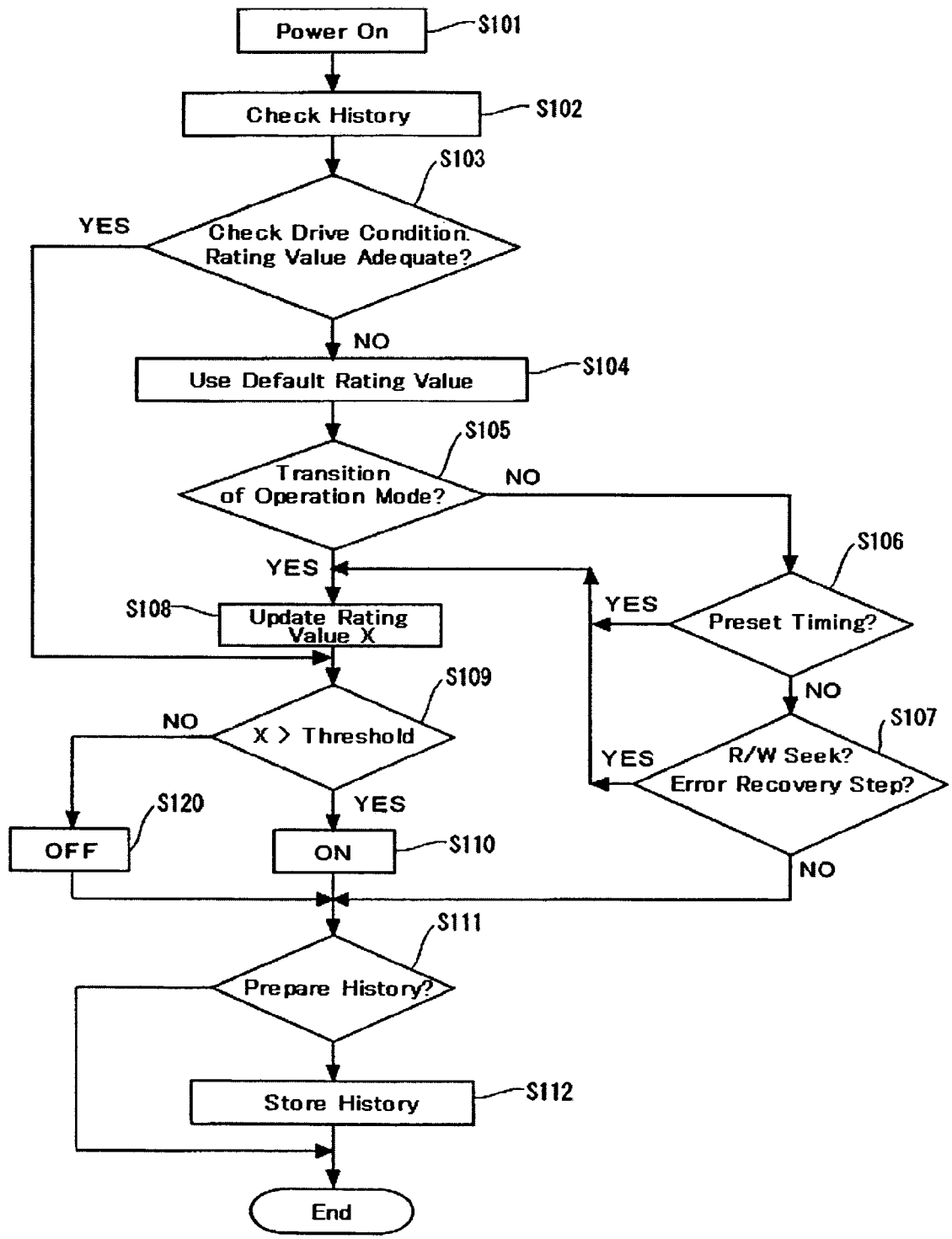
FIG. 4 is a flowchart showing how the HDD of the embodiment is controlled.

Referring to FIG. 4, the following provides a description of the process to update the rating value and determine whether to perform the position error compensation. FIG. 4 is a flowchart showing this process.

At first, the HDD 1 is powered on (step S101). Then, a recorded rating value history is checked (step S102). A value recorded in this history is set as the initial rating value to be updated. Then, the drive condition is checked. Upon completion of the drive condition check, the drive becomes ready to perform R/W operation. During the drive condition check, a rating value is calculated from the initial rating value recorded as a history. In step S102, the second-mentioned arithmetic processing is executed.

Then, it is judged whether the rating value calculated by this arithmetic processing is appropriate (step S103). The updated rating value is judged appropriate or not based on the rating value history. For example, the largest and smallest rating values ever are recorded in the history. If the rating value updated by the second-mentioned processing falls between the largest rating value and the smallest rating value, the updated rating value is judged appropriate. If the updated rating value does not fall between the largest and smallest values, the rating value is judged not appropriate. If the updated rating value is appropriate, control goes to step S109. If the rating value is not appropriate, a default rating value is used (step S104). This default rating value may be either preliminarily stored or calculated from a value in the history. The default rating value is updated in the subsequent step.

To judge whether it is time to update the rating value, it is judged at first whether the operation mode is going to be switched, that is, whether timing (4) has come (step S105). If the operation mode is going to be switched, control goes to step S108 to update the rating value. If the operation mode is not going to be switched, it is judged whether a preset timing has come (step S106). This preset timing is timing set by the user or the host. For example, this preset timing comes at fixed intervals. If the preset timing has come, control goes to step S108 to update the rating value. If the preset timing has not come, control goes to step S107. In step S107, it is judged whether a R/W seek is going to be started and whether an error recovery step is ongoing. That is, if seek is going to be started (timing (1)) or error recovery is being performed (timing (2)), control goes to step S108 to update the rating value X. Otherwise, control goes to step S112 without updating the rating value.

If it is determined to update the rating value either in step S105, step S106 or step S107, the rating value X is updated as mentioned above. Then, it is judged whether the rating value X updated in step S108 is larger than a threshold (step S109). If the rating value X is not larger than the threshold, the position error compensating function is turned OFF (step S120). On the other hand, if the rating value X is larger than the threshold, the position error compensating function is turned ON (step S110). Then, it is determined whether to prepare a rating value history (step S111). If so, the rating value is recorded (step S112). For example, if the updated rating value does not fall between the largest and smallest rating values ever or if the power supply is going to be turned OFF, the updated rating value is recorded. Of course, the history may be recorded at an appropriate timing.

Thus, the rating value is updated at an appropriate timing. The process described so far, upon completion, is restarted from step S105 unless the power supply is turned OFF. This makes it possible to update the rating value at an appropriate timing and therefore appropriately determine whether to perform the position error compensation.

While the present invention has been described with respect to a specific embodiment thereof, it is to be understood that the present invention is not limited the embodiment described so far. Although the embodiment is a HDD, the present invention is applicable to any data storage apparatus which moves a head to read/write data on a recording medium. In addition, the arithmetic processing to calculate a rating value is not limited to the aforementioned processing. The rating value may also be calculated by another arithmetic processing.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data storage apparatus that includes a storage medium and a head to write data to the storage medium and/or read data from the storage medium, the data storage apparatus comprising:

a servo control section which, based on servo data stored on the storage medium, generates servo control data to control the position of the head;

a drive signal generating section which, based on the servo control data, generates a drive signal to move the head;

a sensor to detect vibration;

a compensation data generating section which, based on an output of the sensor, generates compensation data to compensate the position of the head for a position error caused by the detected vibration;

an arithmetic processing section which calculates a rating value to evaluate the level of vibration given to the data storage apparatus wherein the rating value is calculated by using a plurality of sensor output values indicative of the detected level of vibration; and a determination processing section which, according to the calculated rating value, determines whether to perform the compensation using the compensation data;

wherein, if the determination processing section determines to perform the compensation, the drive signal generating section compensates the servo control data using the compensation data in generating the drive signal.

2. A data storage apparatus according to claim 1, wherein at a timing just after the data storage apparatus is powered on, the rating value is calculated and whether to perform the compensation is determined based on the calculated rating value.

3. A data storage apparatus according to claim 2, further comprising:
a history recording section to record a history of the rating value;
wherein at a timing just after the data storage apparatus is powered on, a rating value is calculated based on the rating value contained in the recorded rating value history.

4. A data storage apparatus according to claim 2, wherein at a timing just after the data storage apparatus is powered on, whether to perform the compensation is determined before the data storage apparatus becomes ready to read/write data.

5. A data storage apparatus according to claim 2, wherein:
in an operation mode where the head can be driven, the arithmetic processing section updates the rating value based on the current rating value and the sensor output values; and
the number of the sensor output values used to calculate the rating value is larger than the number of the sensor output values used to update the rating value.

6. A data storage apparatus according to claim 1, wherein at a timing when the operation mode is switched from a mode where the head is at a standstill to a mode where the head can be driven, the rating value is calculated based on the sensor output values.

7. A data storage apparatus according to claim 6, wherein the rating value is calculated based on the sensor output values at a timing when a power-saving mode where data read/write is not performed is switched to a mode where the head can be driven, and/or at a timing when a state where the data storage apparatus is at a standstill is switched to a state where the recording medium starts to rotate, and/or at a timing when returning from a state where the head rests on a ramp or parks on the recording medium.

8. A data storage apparatus according to claim 1, wherein the rating value is based on the integral of the sensor output value.

9. A data storage apparatus that includes a storage medium and a head to write data to the storage medium and/or read data from the storage medium, the data storage apparatus comprising:
a servo control section which, based on servo data stored on the storage medium, generates servo control data to control the position of the head;
a drive signal generating section which, based on the servo control data, generates a drive signal to move the head;
a sensor to detect vibration;
a compensation data generating section which, based on an output of the sensor, generates compensation data to compensate the position of the head for a position error caused by the detected vibration;
a history recording section which records the history of a rating value to evaluate a level of vibration given to the data storage apparatus;
an arithmetic processing section which, at a timing just after the data storage apparatus is powered on, calculates a rating value to evaluate the level of vibration given to the data storage apparatus wherein the rating value is calculated based on the sensor output value indicative of the detected level of vibration and a history recorded by the history recording section before the data storage apparatus is powered on; and
a determination processing section which, according to the calculated rating value, determines whether to perform the compensation using the compensation data;
wherein, if the determination processing section determines to perform the compensation, the drive signal generating section compensates the servo control data using the compensation data in generating the drive signal.

10. A data storage apparatus according to claim 9, wherein it is judged whether the rating value calculated by the arithmetic processing section is appropriate based on the history recorded in the history recording section and, if the rating value is judged not appropriate, a default value is set as the rating value.

11. A control method for a data storage apparatus that includes a storage medium having servo data stored thereon and a head to write data to the storage medium and/or read data from the storage medium wherein servo control data to control the position of the head is generated based on the servo data and the head is moved by a drive signal generated based on the servo control data, said control method comprising:
detecting vibration of the data storage apparatus by a sensor;
based on an output of the sensor, generating compensation data to compensate the position of the head for a position error caused by the detected vibration;
calculating a rating value to evaluate a level of vibration given to the data storage apparatus wherein the rating value is calculated by using a plurality of sensor output values indicative of the detected level of vibration; and
according to the rating value, determining whether to compensate the servo control data by using the compensation data;
wherein, if it is determined to perform the compensation, the servo control data is compensated using the compensation data in generating the drive signal.

12. A control method according to claim 11, wherein at a timing just after the data storage apparatus is powered on, a rating value is calculated and whether to perform the compensation is determined based on the calculated rating value.

13. A control method according to claim 12, wherein at a timing just after the data storage apparatus is powered on, a rating value is calculated based on the rating value history recorded before the data storage apparatus is powered on.

14. A control method according to claim 12, wherein at a timing just after the data storage apparatus is powered on, whether to perform the compensation is determined before the data storage apparatus becomes ready to read/write data.

15. A control method according to claim 12, wherein:
in an operation mode where the head can be driven, the rating value is updated based on the current rating value and the sensor output values; and
the number of the sensor output values used to calculate the rating value is larger than the number of the sensor output values used to update the rating value.

16. A control method according to claim 11, wherein at a timing when the operation mode of the data storage apparatus is switched from a mode where the head is at a standstill to a mode where the head can be driven, the rating value is calculated based on the sensor output values.

17. A control method according to claim 16, wherein the rating value is calculated based on the sensor output values at a timing when a power-saving mode where data read/write is not performed is switched to a mode where the head can be driven, at a timing when a state where the data storage apparatus is at a standstill is switched to a state where the recording medium starts to rotate, and/or at a timing when returning from a state where the head rests on a ramp or parks on the recording medium.

18. A control method according to claim 11, wherein the rating value is based on the integral of the sensor output value.

19. A control method for a data storage apparatus that includes a storage medium having servo data stored thereon and a head to write data to the storage medium and/or read data from the storage medium wherein servo control data to control the position of the head is generated based on the servo data and the head is moved by a drive signal generated based on the servo control data, said control method comprising:

at a timing just after a power supply is turned on, detecting vibration of the data storage apparatus by a sensor;

based on the output of the sensor, generating compensation data to compensate the position of the head for a position error caused by the detected vibration;

calculating a rating value to evaluate a level of vibration given to the data storage apparatus wherein the rating value is calculated based on the history of the rating value recorded before the power supply is turned on and a sensor output value indicative of the detected level of vibration; and, according to the rating value, determining whether to compensate the servo control data by using the compensation data;

wherein, if it is determined to perform the compensation, the servo control data is compensated by the compensation data in generating the drive signal.

20. A control method according to claim 19, wherein it is judged whether the rating value calculated by the arithmetic processing section is appropriate based on the rating value history and, if the rating value is judged not appropriate, a default value is set as the rating value.

* * * * *